Sept. 6, 1932.  J. A. PINAUD  1,876,018

WIND MOTOR

Filed Dec. 23, 1929   2 Sheets-Sheet 1

Inventor
JOHN A. PINAUD
By his Attorney
Howard W. Dix

Sept. 6, 1932.  J. A. PINAUD  1,876,018

WIND MOTOR

Filed Dec. 23, 1929  2 Sheets-Sheet 2

Inventor
JOHN A. PINAUD
By his Attorney
Howard W. Dix

Patented Sept. 6, 1932

1,876,018

UNITED STATES PATENT OFFICE

JOHN A. PINAUD, OF ATLANTIC HIGHLANDS, NEW JERSEY

WIND MOTOR

Application filed December 23, 1929. Serial No. 416,006.

The invention relates in general to governing devices, and more particularly to constant speed wind motors.

One of the principal objects of the invention is to provide a governing device having close regulation.

Another object of the invention is to provide a wind motor which is light, compact and has but small air resistance.

Another object of the invention is to provide a wind motor having governing parts which work with a minimum of friction.

Another object of the invention is to provide a wind motor which is in static, dynamic and torque balance.

Another object of the invention is to provide a wind motor rugged in construction, relatively inexpensive to manufacture and simple and efficient in operation.

Figure 1:
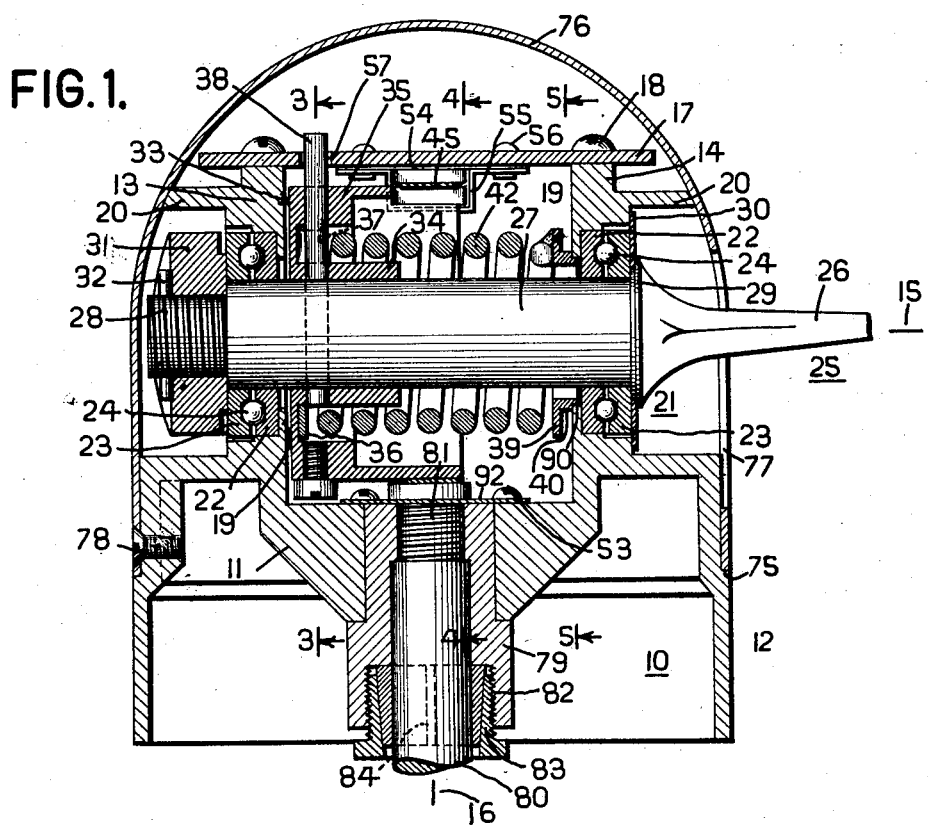
Figure 2:
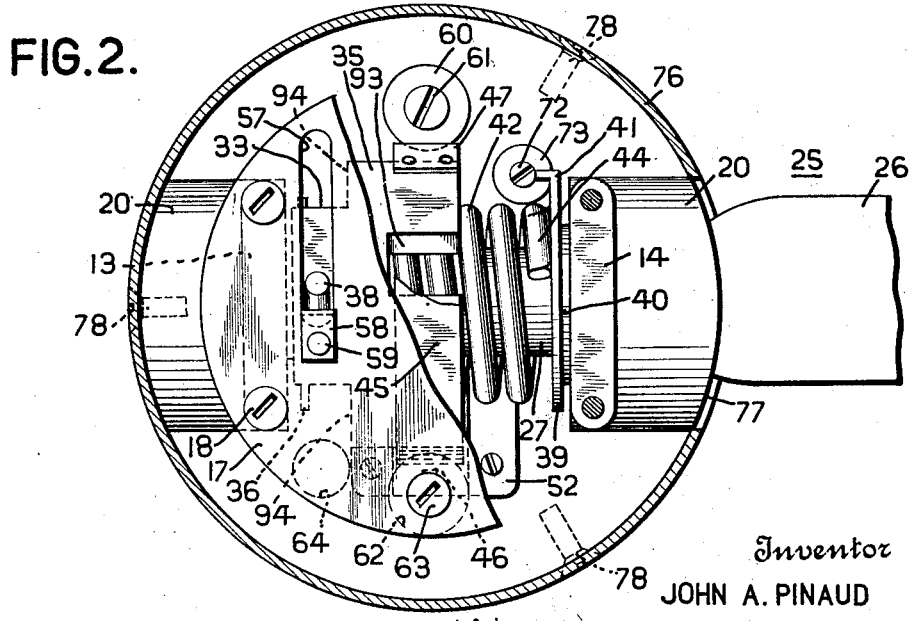
Figure 3:
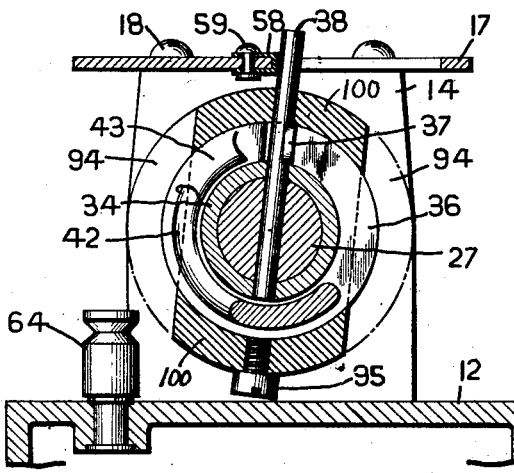
Figure 4:
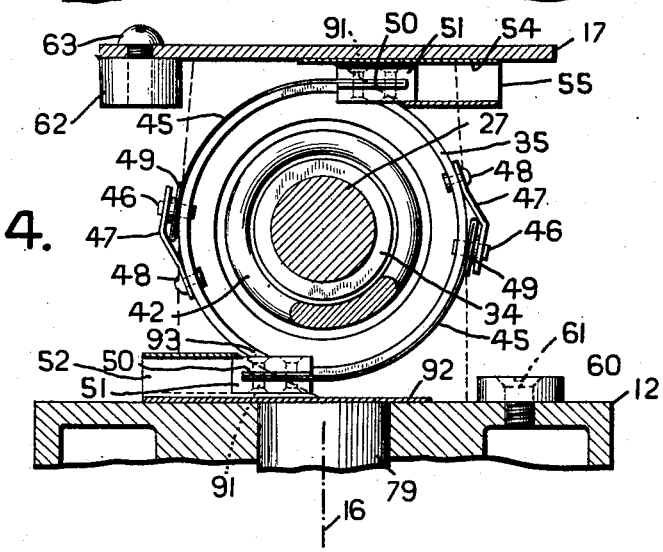
Figure 5:
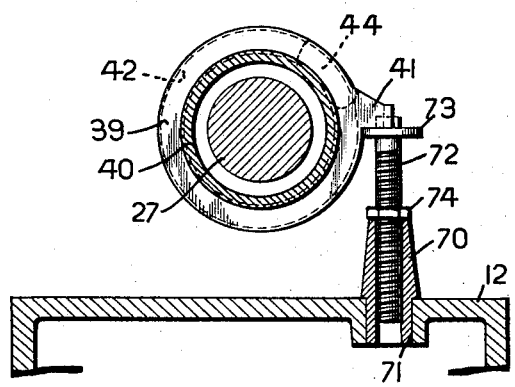

Other objects of the invention will be apparent from the following description and claims when considered with the accompanying drawings, in which Fig. 1 is a cross section through a wind motor according to the invention;

Fig. 2 is a top view partly in section, with certain parts broken away for the sake of clearness; and Figs. 3, 4 and 5, are sections taken respectively on the lines 3—3, 4—4 and 5—5 of Fig. 1.

In the following description and in the claims parts will be identified by specific names for convenience, but they are intended to be as generic in their application to similar parts as the art will permit.

Like reference characters denote like parts in the several figures of the drawings.

Referring now to the drawings, the wind motor comprises a hub 10 having a central attaching sleeve 11, and an outer skirt 12. Projecting from the attaching sleeve 11 are bearing sleeves 13 and 14 which are disposed upon an axis indicated at 15 which is perpendicular to and which intersects the main axis indicated at 16. A flat plate 17 is fastened to the flat ends of the bearing sleeves 13 and 14 by screws 18. The bearing sleeves have projecting portions 20 for a purpose hereinafter described more in detail.

Each bearing sleeve is provided with a cylindrical shouldered bearing portion and a shoulder 19. Disposed in each bearing sleeve is a ball bearing indicated generally by 21 and comprising an inner race 22 and outer race 23 having a plurality of balls 24 therebetween positioned in annular grooves in the respective races.

Journalled within the ball bearings 21 is a fan member 25 comprising a relatively flat blade 26 and a shaft 27 having a reduced threaded stud 28. The fan member 25 has a shoulder 29 between which and the race 23 a flat plate 30 is positioned. A nut 31 is threaded upon a stud 28, the nut being provided with a plurality of grooves in one of which is inserted a locking pin 32 passing through an appropriate hole in stud 28. It will be seen that the shoulder 29 and the shoulder provided by the nut 31 serves to maintain the proper axial position of the fan member 25. The bearing sleeves 13 and 14 have clearance spaces for the outer races 23.

Surrounding the shaft 27 is a compound sleeve 33 comprising an inner sleeve 34 and an outer sleeve 35 connected by a flat flange portion. Disposed between the concentric sleeves 34 and 35 is a flat washer 36 having a part thereof bent outwardly to form a lug 37 (Fig. 3). A locking pin 38 passes through openings in the concentric sleeves 34 and 35 in shaft 27 and has a notch in which the lug 37 seats, this lug being maintained in its position by the action of the spring hereinafter described more in detail.

At the other end of the shaft 27 is an angled washer 40 having a radial flange 39 and a shouldered flange 90 fitting within the shoulder 19. A strong helical spring 42 surrounds the sleeve 34 and shaft 27 and the ends thereof are suitably attached, preferably by solder to the ring 36 at 43 (Fig. 3) and to the ring 42 at 44 (Fig. 5).

Ring 40 is provided with an angled lug 41 resting upon a plate 73 suitably secured to a threaded stud 72. The hub 10 is provided with an opening 71 in which is secured a shouldered pedestal 70 internally screw threaded to receive stud 72. A lock nut 74 serves to lock stud 72 in adjusted position.

A pair of flat flexible bands 45 are secured to and wrapped about outer sleeve 35 as indicated in Fig. 4. These bands 45 are pivotally secured by pivots 46, passing through openings in the end of the bands and suitably secured to the sleeve 35. The bands 45 are bent back on themselves at their ends as indicated at 49 to provide extra strength at the pivot points. Clips 47 suitably secured to the sleeve 35, preferably by rivets 48, have openings in their ends through which the pivots 46 pass, and washers are provided between the clips 47 and the bands 45 to hold the latter in position.

At the free end of each band is a governing weight 51 suitably slotted to receive the bent back double end 50 of the band. Suitable fastening devices, preferably rivets 91, secure the ends 50 and governing weights 51 together.

A flat plate 92 is suitably secured to the attaching ring 11 by screws 53. Attached to the plate 92 is a guide strap 52 in which one of the weights 51 is adapted to loosely slide. A flat plate 54 and a guide strap 55 are attached to the plate 17 by suitable fastening devices, such as rivets 56, to provide a guide in which loosely slides the other governing weight 51. It will be seen, especially in Fig. 4, that the recesses 93 are provided in the outer sleeve 35 to accommodate the governing weights 51.

The outer skirt 12 is provided with a shoulder 75 and a stream line casing or cover 76 fits over the working parts and is secured by screws 78 flush with the outer surface of the skirt 12. An opening 77 is provided for the fan blade 26. The members 20 assist in maintaining the shell or cover 76 in proper spaced relation.

For mounting the wind motor upon the shaft 80 of the generator or other apparatus to be driven a shouldered sleeve 79 is suitably secured within the attaching sleeve 11. The sleeve 79 is provided with an inner threaded portion 81 and a second inner threaded portion 82. The driven shaft 80 has a reduced threaded inner end which is threaded to the threaded portion 81. A pair of tapered wedges indicated by 84 surround the shaft 80 and a tapered sleeve 83 is threaded within the threaded portion 82 to tightly wedge the wedges 84 against the shaft 80. The threads 81 may be the usual right hand threads, while the threads 82 are preferably left hand threads.

The pitch of threads 81 and 82 are preferably equal. By this arrangement any loosening movement of the hub 10 on the threads 81 is accompanied by a corresponding tightening movement of the hub 10 on the threads 82. The angle of taper of the wedges 84 is less than the angle of the screw threads 82 and hence the lock sleeve or collar 83 will turn on the threads and move with the driven shaft 80. If the hub is turned in such direction as to loosen right-hand screw threads 81, it will tighten left-hand screw threads 82 and thereby drive the wedges 84 more tightly in position. This will continue until the wedges 84 are driven so tight that the hub is clamped to the shaft 80 so firmly at this point that no further loosening of right-hand threads 81 can take place. Thus an effective locking device is provided which prevents loosening of the wind motor on its supporting shaft even under the abrupt changes in wind motor speed within the governing limits of the wind motor.

It will be noted that the parts of the compound sleeve 33 have recesses or cut-away portions indicated by 94 in Fig. 3. This serves to provide in effect weights 100 at points about the transverse axis 15 perpendicular to the recesses 94. It will be noted that the recesses 94 are opposite each other and in the same plane as the blade 26. In other words, the effective weights 100 which remain after cutting the recesses 94 are in a plane which is at right angles to the plane of the blade 26. To counter-balance the weight of the pin 38 a screw 95 may be threaded into one of the effective weights 100.

A post 64 (Fig. 3) is secured to the hub 10 directly opposite the stud 72 and pedestal 70 with respect to the main axis 16 to compensate for the mass of these adjusting devices. The post 64 is grooved at the top to provide a stop for the screw 95 to limit the angular movement of the fan member 26 about its own axis under governing action.

It will be understood that the centrifugal force exerted upon the ball bearings 21, and particularly on the balls thereof 24, due to the rotation about the main axis 16, will cause these parts to jamb unless precautions are taken. It is for this reason that axial type thrust bearings are used to give radial bearing support to the fan member. It will be understood that the parts including the fan member and those attached thereto are balanced with respect to the main axis 16 so that the ball bearings 21 do not have to take any out-of-balance forces.

It can be proven theoretically, and it is well known in practice, that, if a blade such as indicated by 26 is revolved about the main axis 16, it ordinarily seeks to assume a plane perpendicular to the axis 16 due to the unsymmetrical or flat shape thereof. By providing counter-balancing weights disposed in a plane at right angles to the plane of the blade and mounted upon the fan member, the fan member is placed in torque balance, that is, there is no inherent tendency for the fan member to turn one way or the other when it is rotated about the main axis 16 due to the inherent distribution of total mass therein. This allows freedom of operation of special governing devices.

Although, as indicated in Fig. 4, the governing weights 51 are symmetrically disposed with respect to the main axis 16, due to the high speed of revolution about the axis 16 an unbalance is obtained due to what may be called a "whip" effect. This action results from the longitudinal spacing of the governing weights 51 along the axis 16. To overcome this a weight 60 is provided which is secured to the hub by a screw 61 and a second weight 62 is provided which is secured to the flat plate 17 by a screw 63. These weights serve to counter-balance the centrifugal force exerted by the governing weights 51 when they have flown out to assume their operative position at the operating speed it is desired to maintain.

It will be seen that the centrifugal force upon the spring 42 tends to unwind the spring; hence a heavier spring must be used than ordinarily would, to counteract this effect. The position of the spring across the main axis 16, however, serves to reduce the centrifugal force upon the spring to a minimum. It will be noted furthermore that the weld points 43 and 44 are in substantially the same plane passing through the transverse axis 15 when the spring is compressed to its operating position. This assists in cutting down oscillation of the spring and governing parts. It will furthermore be noted that each convolution of the spring is spaced from the others and the end convolutions are spaced from the welding points. This cuts down friction between the operating parts. It will furthermore be noted that the guides for the governing weights 51 are radial with respect to the main axis 16 and that the weights fit loosely in the guides. The pivoted connections between the straps 45 and the sleeve 35 allow the straps to easily assume the position imposed upon them by the action of the governing weights 51.

It has been found that it is of utmost importance to reduce friction between the operating parts to a minimum in order to obtain delicate and sensitive governing action. Furthermore in order to cut down vibrations the parts must be in static, dynamic and torque balance. It is furthermore important that the blade axis 15 exactly intersect the main axis 16 or else special balancing must be done.

The ball bearings are arranged so that no jamming can occur under the considerable force exerted by the rotation thereof about the main axis 16. At the same time the fan member 25 is freely journalled within the hub 10.

The pin 38 not only provides an abutment for the lug 37 but the abutment prevents accidental displacement of the pin out of position by fitting within the notch in the pin. The hole 57 in the plate 17 allows the pin to move under governing action and at the same time serves as an abutment to limit the zero position of the blade. The strap 58 which is secured to the plate 17 by the rivet 59 serves to take the force which would otherwise be exerted upon the plate which is preferably made of a light material, such as aluminum, which may not be able to stand the battering of the pin 38.

By moving the adjusting screw 72 the tension of the spring 42 can be adjusted to change the governing speed to that desired.

Due to the wrapping of the straps 45 about the cylindrical surface of the flange 35 the governing weights 51 always act tangentially about the transverse axis 15. Since the centrifugal force exerted upon the governing weights 51 about the main axis 16 is proportional to the distance of the weights from this axis it will be seen that the centrifugal force is directly proportional to the angular displacement of the blade 26 from the zero position. The spring 42 is also arranged so that its opposing force is directly proportional to the angle of the blade 26 from zero position. This straight line relation is important in providing a smooth and close governing operation.

This application is an improvement over Patent No. 1,768,784, granted to John A. Pinaud on July 1, 1930.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

I claim:

1. An adjustable device comprising a hub member having a main axis, a transverse member having a transverse axis, means for pivotally mounting said transverse member on said hub member so that the transverse member is pivotable about its own axis, actuating means responsive to the speed of rotation about said main axis for changing the angular position of said transverse member about its own axis, restoring means opposing said actuating means, said actuating means comprising a concentric cylindrical drum on said transverse member, a thin flat strap freely pivoted to said drum and wrapping around said drum, and a governing weight at the end of said strap, whereby said weight is free to seek a true radial position with respect to said main axis.

2. An adjustable device comprising a hub member having a main axis, a transverse member having a transverse axis, means for pivotally mounting said transverse member on said hub member so that the transverse member is pivotable about its own axis, actuating means responsive to the speed of rotation about said main axis for changing the angular position of said transverse member about its own axis, restoring means opposing said actuating means, said actuating means comprising a concentric cylindrical drum on said transverse member, flexible members connected at opposite points to said drum and wrapping around said drum, a governing weight at the end of each flexible member, said weights being in substantially the same plane perpendicular to the axis of said transverse member and spaced axially of said main axis, and balancing weights on said hub member on opposite sides of said main axis from said balancing weights.

3. An adjustable device comprising a hub member having a main axis, a transverse member having a transverse axis, means for pivotally mounting said transverse member on said hub member so that the transverse member is pivotable about its own axis, actuating means responsive to the speed of rotation about said main axis for changing the angular position of said transverse member about its own axis, restoring means opposing said actuating means, said actuating means comprising a concentric cylindrical drum on said transverse member, a flexible member connected to said drum and wrapping around said drum, a governing weight at the end of said flexible member, said drum having a recess for said weight, whereby said weight is positioned closer to said main axis to allow use of small restoring means.

4. In a wind motor, a hub having a central attaching sleeve, said sleeve having bearing rings on a transverse axis substantially perpendicular to the main axis of said attaching sleeve and spaced on said opposite sides of said hub, a top plate bridged across the top of said rings, a fan member comprising a blade and a shaft, means journalling said shaft in said bearing rings, a compound sleeve member comprising an inner sleeve surrounding said shaft, and outer sleeve, and a collar connecting said inner and outer sleeves, a washer against said collar and having a lug, a pin passing through said inner and outer sleeves and shaft, and having a notch seating said lug, a helical spring surrounding said inner sleeve and shaft, means securing said spring respectively to said hub and to said washer, actuating means for changing the angular position of said fan about said transverse axis, said top plate having a slot in which said pin works providing an abutment for said pin.

5. An adjustable device comprising a hub member having a main axis, a transverse member having a shaft on its transverse axis, means for pivotally mounting said transverse member on said hub member so that the transverse member is pivotable about its own axis, actuating means responsive to the speed of rotation about said main axis for changing the angular position of said transverse member about its own axis, restoring means opposing said actuating means, said restoring means comprising a helical spring surrounding said shaft, ring-like members welded respectively to the ends of said spring, means for affixing said ring-like members to said shaft and hub respectively, the welding points being at substantially opposite points with respect to said main axis when in operating position.

6. In a wind motor, a hub having a central attaching sleeve, said sleeve having bearing rings on a transverse axis substantially perpendicular to the main axis of said attaching sleeve and spaced on said opposite sides of said hub, a top plate bridged across the top of said rings, said rings having inner shoulders, end thrust ball bearings in said rings against said shoulders, a fan member comprising a blade and a shaft, said shaft passing through said ball bearings, abutments on said shaft against said ball bearings, a compound sleeve member comprising an inner sleeve surrounding said shaft, an outer sleeve, and collar connecting said inner and outer sleeves, a first washer against said collar and having a lug, a pin passing through said inner and outer sleeves and shaft and having a notch seating said lug, a second washer seating within the shoulder of the ring bearing opposite said first washer, helical spring surrounding said inner sleeve and shaft, the ends of said spring being welded respectively to said washers at points at substantially opposite points with respect to the main axis, flat flexible bands pivoted to the outer surface of said outer sleeve, governing weights at the ends of said bands, said outer sleeve having recesses at opposite points for said weights, guides enclosing said weights and attached respectively to said top plate and attaching collar, said guides being radial with respect to said main axis.

7. In a wind motor, a hub having a central attaching sleeve, and an outer skirt, said sleeve having bearing rings on a transverse axis substantially perpendicular to the main axis of said attaching sleeve and spaced on said opposite sides of said hub, a top plate bridged across the top of said rings, said rings having inner shoulders, end thrust ball bearings in said rings against said shoulders, a fan member comprising a blade, a shaft, and a shoulder therebetween, said shaft passing through said ball bearings and having a reduced stud, a nut threaded on said stud, said shoulder and nut abutting said ball bearings, a compound sleeve member comprising an inner sleeve surrounding said shaft, outer sleeve, and collar connecting said inner and outer sleeves, a first washer against said collar and having a lug, a pin passing through said inner and outer sleeves and shaft and having a notch seating said lug, an angled washer seating within the shoulder of the ring bearing opposite said first washer, a helical spring surrounding said inner sleeve and shaft, the ends of said spring being welded respectively to said washers at substantially opposite points with respect to the main axis, flat flexible bands pivoted to the outer surface of said outer sleeve, governing weights at the ends of said bands, said outer sleeve having recesses at opposite points for said weights, guides enclosing said weights and attached respectively to said top plate and attaching sleeve, said guides being radial with respect to said main axis, said outer skirt having a shoulder, and a shell cover surrounding said bearing rings and plate and having an opening for said blade and seating flush with said skirt shoulder.

8. In combination, a support, a shaft journalled therein, a spring surrounding said shaft, a pin passing through said shaft, and interfitting abutments on said spring and pin, whereby said spring exerts a relative rotary stress between said shaft and support and said pin is held in position.

9. In combination, a support, a shaft journalled therein, a sleeve and a spring surrounding said shaft, a pin passing through said sleeve and shaft, and interfitting abutments on said spring and pin, whereby said spring exerts a relative rotary stress between said shaft and support, said shaft and sleeve are locked together and said pin is held in position.

JOHN A. PINAUD.